(12) United States Patent
Chen

(10) Patent No.: US 6,728,108 B2
(45) Date of Patent: Apr. 27, 2004

(54) ACCESS DEVICE OF MEMORY CARD

(76) Inventor: Frank Chen, 235 Chung - Ho Box 8-24, Taipei (TW)

( * ) Notice: Subject to any disclaimer, the term of this patent is extended or adjusted under 35 U.S.C. 154(b) by 67 days.

(21) Appl. No.: 10/151,758

(22) Filed: May 22, 2002

(65) Prior Publication Data

US 2003/0147231 A1 Aug. 7, 2003

(51) Int. Cl.[7] .................................................. H05K 1/14
(52) U.S. Cl. ....................... 361/736; 361/683; 361/684; 361/686; 439/502
(58) Field of Search ................................ 361/737, 748, 361/752, 796, 798, 679, 683, 684, 685, 686; 439/502, 503, 61, 76.1

(56) References Cited

U.S. PATENT DOCUMENTS

| 5,136,468 A | * | 8/1992 | Wong et al. ................. 361/683 |
| 5,701,231 A | * | 12/1997 | Do et al. ..................... 361/683 |
| 5,921,816 A | * | 7/1999 | Larabell ...................... 439/638 |
| 6,067,226 A | * | 5/2000 | Barker et al. ................ 361/686 |
| 6,301,104 B1 | * | 10/2001 | Hu .............................. 361/684 |
| 6,522,532 B2 | * | 2/2003 | Liao et al. ................... 361/686 |
| 6,560,097 B2 | * | 5/2003 | Naruo et al. ................ 361/685 |
| 6,560,099 B1 | * | 5/2003 | Chang ......................... 361/685 |
| 6,567,360 B1 | * | 5/2003 | Kagawa ..................... 369/75.1 |

* cited by examiner

*Primary Examiner*—David Martin
*Assistant Examiner*—Thanh S. Phan

(57) ABSTRACT

An access device of a memory card comprises a substrate for providing a receiving space. The substrate is positioned in an expanding slot of a system mainframe. The receiving space of the substrate has a control panel. The control panel has a control IC for accessing and converting signal formats of a memory card. At an end for outputting data signal on the control panel has a data wire for outputting signals from the control panel. The data wire is directly connected to a specific interface in a mother board of a system. Another data wire connected in parallel with the data wire is connected to an external interface of a back plate of the mainframe so that the external interface is still utilized by other devices. Thereby, the data inputted to the memory card can be accessed directly from the system mainframe without any external device.

3 Claims, 3 Drawing Sheets

ACCESS DEVICE OF MEMORY CARD

FIELD OF THE INVENTION

The present invention relates to memory card devices, and particularly to an access device of a memory card. No further card reader is necessary and thus no complicated connection for system mainframe is necessary. No wire interruption and bad contact occur.

BACKGROUND OF THE INVENTION

With the advance of computer technology, the storage mediums developed from silicon semiconductor technologies become more and more popular. Flash memory cards are especially important in the silicon storage medium. Comparing with the floppy disks and compact disks, the flash memory cards are convenient, rapid, repeatable, shock-and-wet proofed, and consumes less power.

Various flash memory cards are developed by for example Sony, TOSHIBA, Siemens, Matsushita, Samaung, SanDisk, etc. Moreover, the flash memory cards are widely used to various digital products, such as PAMCIA cards, Compact Flash cards, SM cards (Smart Media cards), MMC cards (MultiMedia Cards), MS cards (Memory Stick Cards), SD cards (Secure Digital Cards), etc.

Flash memory cards are used in various portable digital devices, for example, digital cameras, digital recorders, PDAs, etc. for storing drawings, cartoons, music, and other software data. To enhance the data transformation connected the flash memory cards and mainframes (such as a personal computer, an industrial computer, a video decorder, etc.), various reader for reading data in the flash memory card are developed.

The prior art memory card reader has an independent card reader. The card reader has a data wire which is connected to an external interface of the system mainframe so that the data stored in the memory card can be edited, played, stored and executed. However, it is not convenient since the data accessing operation must be positioned through complex wire connections. It is possible that the wire connection is incorrect or the connection is interrupted or is bad in contact so that the signals are unstable.

SUMMARY OF THE INVENTION

Accordingly, the primary object of the present invention is to provide an access device of a memory card, wherein no further card reader is necessary and thus no complicated connection for system mainframe is necessary. No wire interruption and bad contact occur.

To achieve above objects, the present invention provides an access device of a memory card comprises a substrate for providing a receiving space. The substrate is positioned in an expanding slot of a system mainframe. The receiving space of the substrate has a control panel. The control panel has a control IC for accessing and converting signal formats of a memory card. At an end for outputting data signal on the control panel has a data wire for outputting signals from the control panel. The data wire is directly connected to a specific interface in a mother board of a system. Another data wire parallelly connected with the data wire is connected to an external interface of a back plate of the mainframe so that the external interface is still utilized by other devices. Thereby, the data inputted to the memory card can be accessed directly from the system mainframe without any external device.

The various objects and advantages of the present invention will be more readily understood from the following detailed description when read in conjunction with the appended drawing.

DETAILED DESCRIPTION OF THE PREFERRED EMBODIMENTS

Figure 1:
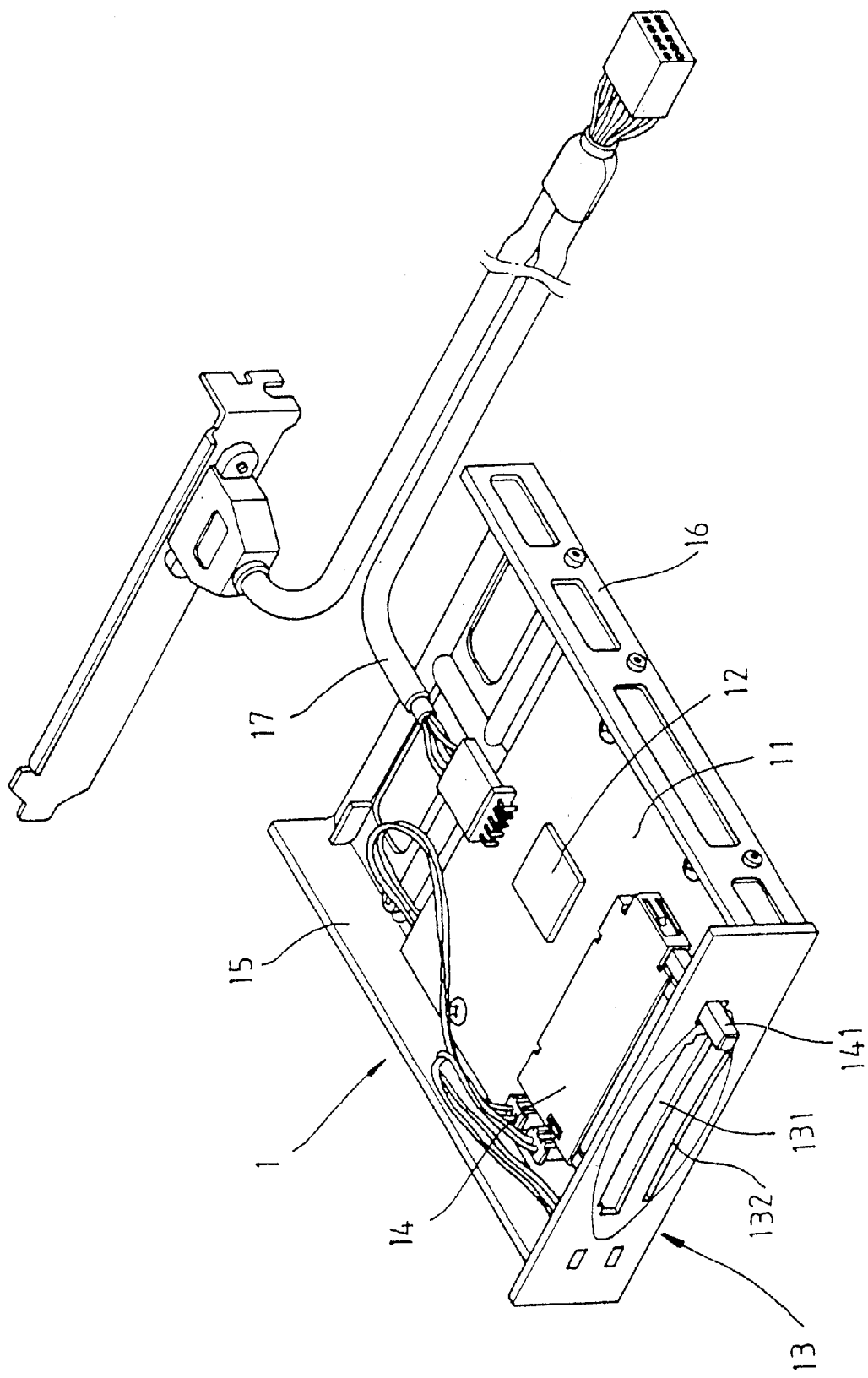
FIG. 1 is a structural schematic view of the access device of a memory card of the present invention.
Figure 2:
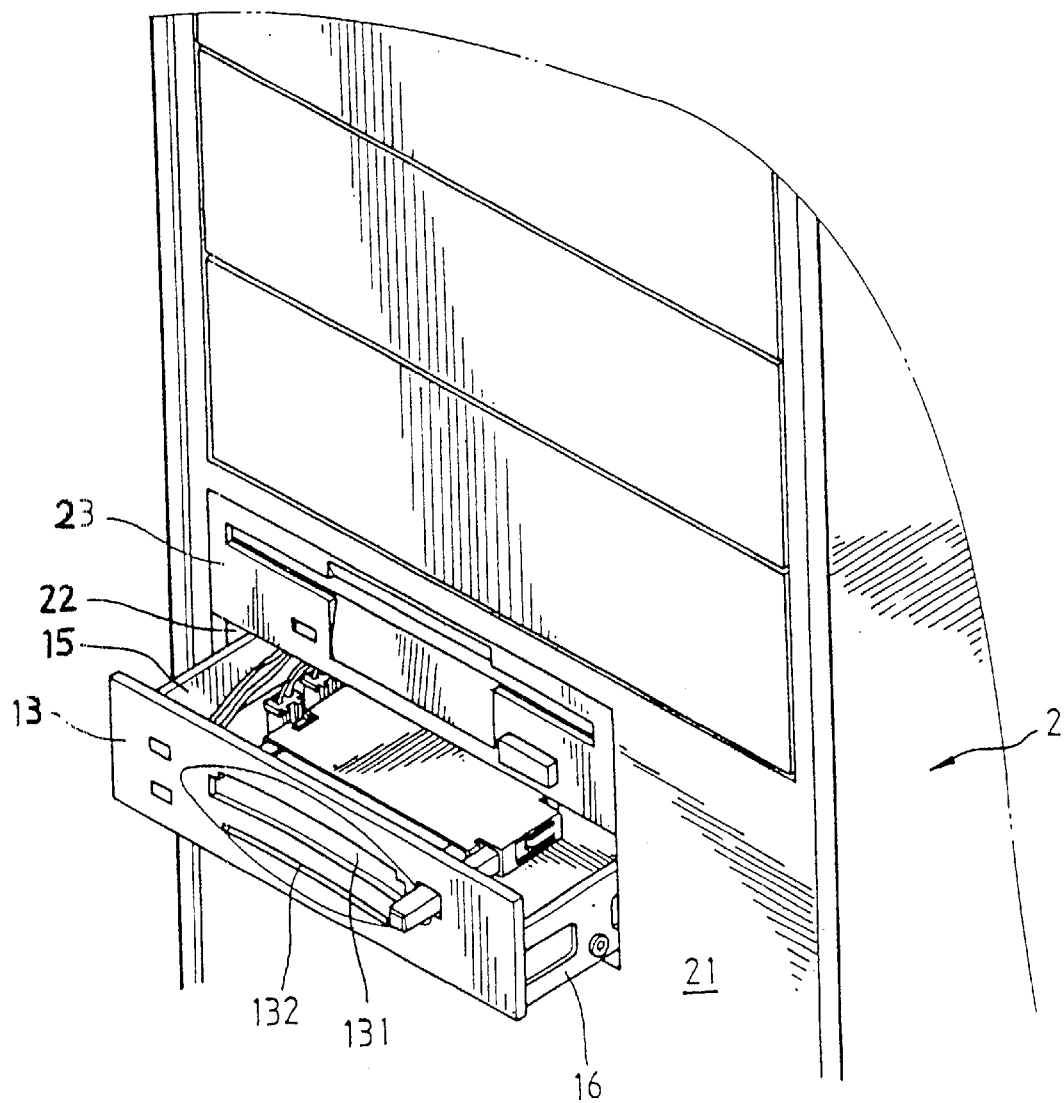
FIG. 2 is a structure view showing that the access device of a memory card of the present invention is installed to a system mainframe.

Referring to FIG. 1, the access device of a memory card of the present invention includes a substrate 1 for providing a receiving space. The receiving space 1 of the substrate 1 has a control panel 11. The control panel 11 has a control IC 12 for accessing and converting the signal format of a memory card. A front surface of the substrate 1 is a connecting panel 13 for connecting to the memory card. The connecting panel 13 has a plurality of slots 131, 132. A back surface of the connecting panel 13 has a signal connecting means 14. Thereby, when the memory card is inserted into the connecting panel 13, the memory card will be in contact with the connecting means 14, causing the data signal to be transferred to the circuit of the control panel 11. Besides, the control panel 11 further includes a linkage 141 for retracting the card. Two lateral sides of the substrate 1 have stoppers 15 and 16 for fixing the substrate 1 to the mainframe of a system, as shown in FIG. 2. Preferably, the substrate 1 is fixed to the expanding slot 22 in the panel 21 of the system mainframe 2, such as the position for installing a floppy disk, or other expanding slot 22.

Figure 3:
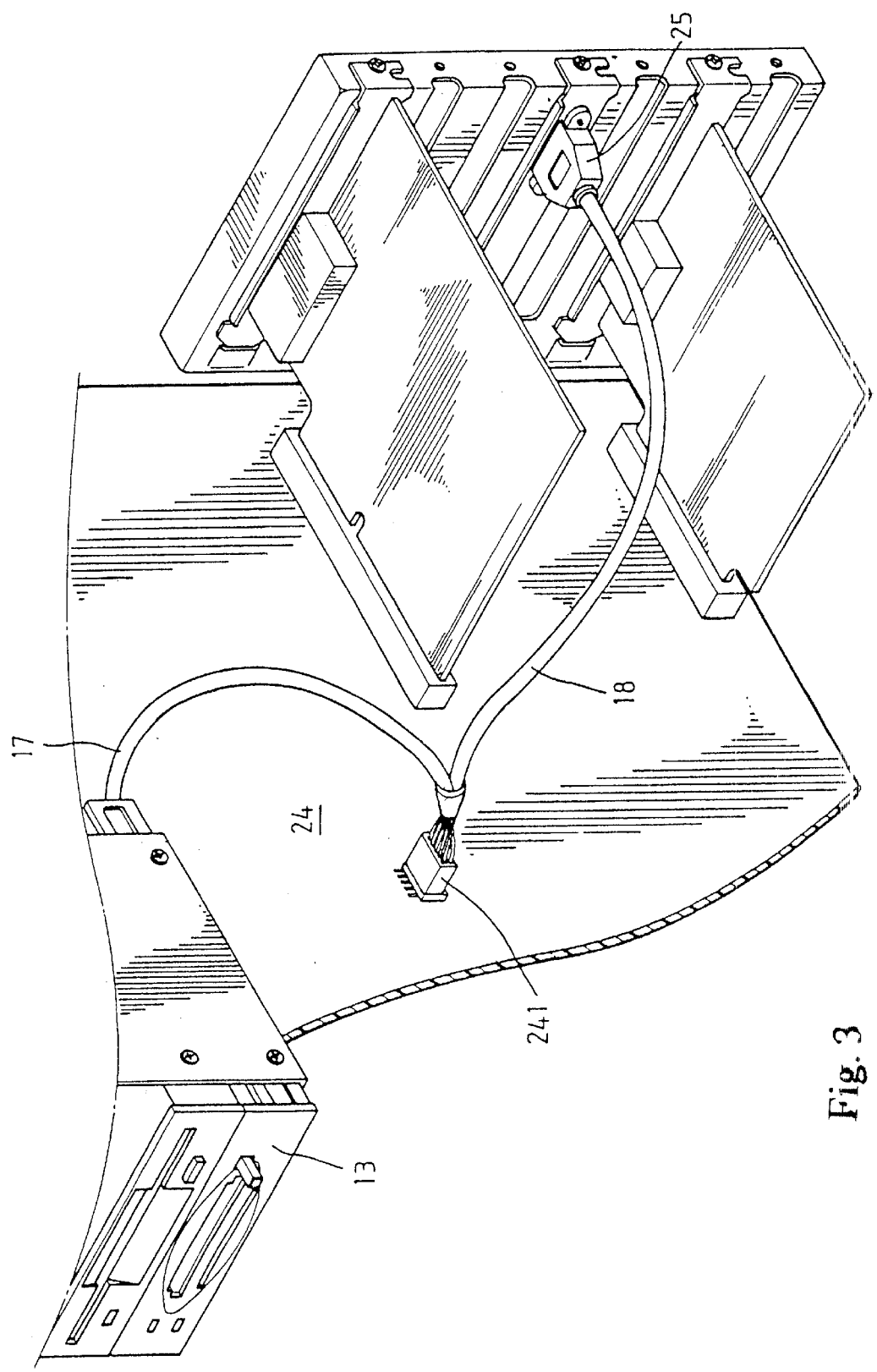
FIG. 3 shows the connection of the data access device of a mother board of the present invention and a system mainframe.

Referring to FIG. 3, at an output end of data signal on the control panel 11 has a data wire 17 for outputting signals from the machine panel. The data wire 17 is connected to the mother board 24 of the system. Currently, the data wire 17 is connected to the USB interface 241 of the mother board 24. Another data wire 18 parallelly connected with the data wire 17 is connected to an external interface 25 of the back plate of the mainframe so that the external interface 25 can be utilized by other device.

As described above, the access device of a memory card of the present invention is installed to a mainframe of a system (such as, a personal computer, an industrial computer, a servo computer, etc.). Then the mother board 24 can be inserted into the slots 131, 132 of the connecting panel 13 of the access device. Then, signals are transferred to the circuit of the control panel 11 by the signal connecting means 14. The data accessing can be driven by the control IC 12 on the control panel 11. Finally, data is sent to the system mother board 24 at another end through the data wire 17. Thereby, no further card reader is necessary and thus no complicated connection for system mainframe is necessary. No wire interruption and no bad contact occur.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An access device of a memory card comprising a substrate for providing a receiving space; the substrate being positioned in an expanding slot of a system mainframe; the receiving space of the substrate having a control panel; the control panel having a control IC for accessing and converting signal formats of a memory card; at an end for outputting data signal on the control panel having a first data wire for outputting signals from the control panel; the first data wire being directly connected to a specific interface in a mother board of a system; a second data wire connected in parallel with the first data wire being connected to an external interface of a back plate of the mainframe so that the external interface is still utilized by other devices.

2. The access device of a memory card as claimed in claim 1, wherein the specific is a USB interface.

3. The access device of a memory card as claimed in claim 1, wherein a front surface of the substrate is a connecting panel for connecting to the memory card; the connecting panel has a plurality of slots; a back surface of the connecting panel has a signal connecting means; thereby, when the memory card is inserted into the connecting panel; the memory card will be in contact with the connecting means, causing the data signal to be transferred to the circuit of the control panel.

* * * * *